US008520062B2

(12) United States Patent
Kim et al.

(10) Patent No.: US 8,520,062 B2
(45) Date of Patent: Aug. 27, 2013

(54) DISPLAY APPARATUS

(75) Inventors: Hwi Kim, Seoul (KR); Jihyun Bae, Seoul (KR); Kyungho Jung, Yongin-si (KR); Seung-Hoon Lee, Hwaseong-si (KR); Heeseop Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 367 days.

(21) Appl. No.: 12/903,576

(22) Filed: Oct. 13, 2010

(65) Prior Publication Data
US 2011/0216169 A1 Sep. 8, 2011

(30) Foreign Application Priority Data
Mar. 4, 2010 (KR) .................. 10-2010-0019536

(51) Int. Cl.
*H04N 13/04* (2006.01)

(52) U.S. Cl.
USPC .............................................. 348/51; 348/54

(58) Field of Classification Search
USPC ............. 348/51, E13.075; 445/24; 349/15, 349/110, 477, 122, 95, 187; 345/214; 359/466, 359/463
See application file for complete search history.

(56) References Cited

U.S. PATENT DOCUMENTS

| 5,069,813 A * | 12/1991 | Patel ........................ 252/299.01 |
| 6,064,424 A * | 5/2000 | van Berkel et al. .............. 348/51 |
| 6,118,584 A * | 9/2000 | Van Berkel et al. ........... 359/463 |
| 6,151,062 A * | 11/2000 | Inoguchi et al. ................. 348/51 |
| 7,123,287 B2 * | 10/2006 | Surman ........................... 348/51 |
| 7,907,223 B2 * | 3/2011 | Maeda .............................. 349/15 |
| 2002/0069550 A1 * | 6/2002 | Noguchi et al. ................. 33/623 |
| 2006/0208981 A1 * | 9/2006 | Rho et al. ......................... 345/88 |
| 2008/0204550 A1 * | 8/2008 | De Zwart et al. ............... 348/51 |
| 2009/0015738 A1 * | 1/2009 | Hong et al. ...................... 349/15 |
| 2009/0091613 A1 * | 4/2009 | Louwsma et al. .............. 348/51 |
| 2009/0097113 A1 | 4/2009 | Ansbro et al. |

FOREIGN PATENT DOCUMENTS

| JP | 08-179259 A | 7/1996 |
| KR | 1020030087310 A | 11/2003 |
| KR | 1020070073445 A | 7/2007 |
| KR | 100811818 B1 | 3/2008 |
| KR | 10200900006473 A | 1/2009 |
| KR | 1020090022931 A | 3/2009 |
| KR | 1020090060061 A | 6/2009 |
| KR | 1020090111584 A | 10/2009 |

* cited by examiner

*Primary Examiner* — David Czekaj
*Assistant Examiner* — Dramos I Kalapodas
(74) *Attorney, Agent, or Firm* — Cantor Colburn LLP

(57) ABSTRACT

A display apparatus includes a display panel and an optical member. The display panel includes a plurality of a pixel and displays a 2D image. The optical member includes a plurality of a lens, each having a plurality of a focal point and configured such that at least two pixels of the display panel correspond to one 3D pixel. The optical member divides the 2D image into left and right-eye images by using the lenses of the optical member.

17 Claims, 12 Drawing Sheets

DISPLAY APPARATUS

This application claims priority to Korean Patent Application No. 2010-19536 filed on Mar. 4, 2010, and all the benefits accruing therefrom under 35 U.S.C. §119, the contents of which are herein incorporated by reference in their entirety.

BACKGROUND OF THE INVENTION

1. Field of the Invention

The invention relates to a display apparatus. More particularly the invention relates to a display apparatus displaying a 3D image.

2. Description of the Related Art

In general, a 3D image display apparatus divides a 2D image into a left-eye image and a right-eye image through a lenticular scheme or a barrier scheme.

The barrier scheme divides the 2D image into the left-eye image and the right-eye image, by blocking or transmitting lights passing through right and left pixels using a parallax barrier. The lenticular scheme divides the 2D image into the left-eye image and the right-eye image, by using a lenticular lens.

According to the barrier scheme, since a portion of a light is blocked, brightness is reduced, so that display quality may be degraded. In contrast, according to the lenticular scheme, since most light passes through a lenticular lens, the brightness reduction is less than that of the barrier scheme. Recently, various 3D image display apparatuses employing the lenticular scheme have been developed.

BRIEF SUMMARY OF THE INVENTION

The invention provides a display apparatus improve image quality of a 3D image, by improving uniformity of brightness distribution of the 3D image.

In one exemplary embodiment, a display apparatus includes a display panel and an optical member. The display panel includes a plurality of pixels arranged in the form of a matrix and displays a 2D image. The optical member is provided on the display panel and includes a plurality of lenses. Each lens has a plurality of focal points, and is configured such that at least two pixels to correspond to one 3D pixel. The optical member divides the 2D image into left and right eye images by using the lenses. The optical member further includes a base sheet, and the lenses may be provided on the base sheet.

Each lens includes J regions in a second direction, and the J regions includes a portion of J sub lenses, respectively. The sub lenses have the same curvature and are sequentially arranged while partially overlapping with each other in the second direction. An $L^{th}$ region among the J regions includes a portion of an $L^{th}$ sub lens among the J sub lenses, in which L is a natural number in a range of 1 to J.

The optical member may include a liquid crystal electric field lens. The liquid crystal electric field lens includes a first substrate, a second substrate, and a liquid crystal layer interposed between the first and second substrates. The first substrate includes a first base substrate and a plurality of first electrodes spaced apart from each other on the first base substrate. The second substrate includes a second base substrate opposite to the first substrate and a second electrode on the second base substrate. The liquid crystal electric field lens includes a plurality of internal lenses formed due to voltages applied to the first and second electrodes. The internal lenses have a plurality of focal points according to voltage values applied to the first electrodes forming the internal lenses.

As described above, according to the display apparatus of the invention, since the black matrix and pixels can be always viewed in the same ratio through lenses having a plurality of focal points, the uniformity in the brightness distribution can be improved, so that the quality of a 3D image can be improved.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
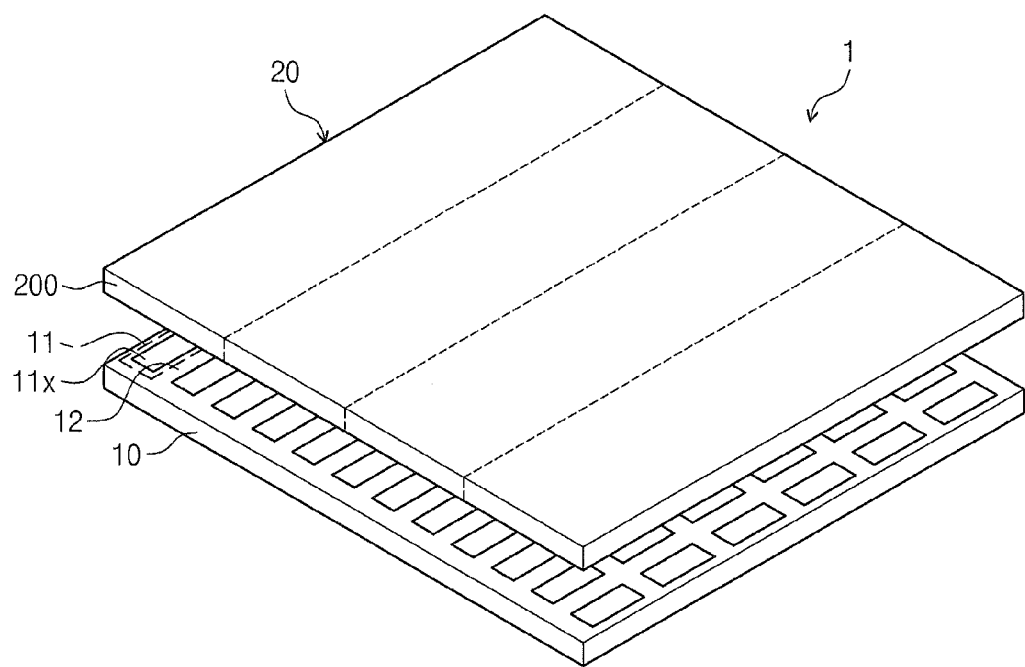
FIG. 1 is an exploded perspective view schematically showing an exemplary embodiment of a display apparatus, according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower", "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in more detail with reference to accompanying drawings.

FIG. 1 is an exploded perspective view schematically showing an exemplary embodiment of a display apparatus, according to the invention.

Referring to FIG. 1, the display apparatus 1 includes a display panel 10 and an optical member 20. The display panel 10 includes a plurality of a pixel 11 arranged in the form of a matrix, and displays a 2D image. In one exemplary embodiment, for example, the display panel 10 may include a plasma display panel ("PDP") or a liquid crystal display panel. Each pixel 11 includes a plurality of a sub pixel 11x, and a black matrix 12 is interposed between the sub pixels 11x with the each pixel 11. The black matrix 12 is also interposed between the plurality of pixels 11. The sub pixels 11x may include one of red, green, and blue sub pixel.

The optical member 20 includes a plurality of a lens 200 corresponding to at least two pixels 11. That is, each lens 200 overlaps at least two pixels 11, as illustrated in FIG. 1. The lenses 200 collectively form a single unitary indivisible member. Each lens 200 is configured such that at least two pixels 11 correspond to one 3D pixel, and the optical member 20 divides a 2D image into left and right-eye images using the lenses 200. The lenses 200 may have a physical lens shape or include a liquid crystal electric field lens.

The optical member 20 is spaced apart from the display panel 10 by focal lengths of the lenses 200. A support (not shown) may be interposed between the display panel 10 and the optical member 20 to maintain the focal length. As used herein, "corresponding" indicates being the same or aligned in quantity, shape, size or positional placement relative to another element.

Figure 2:
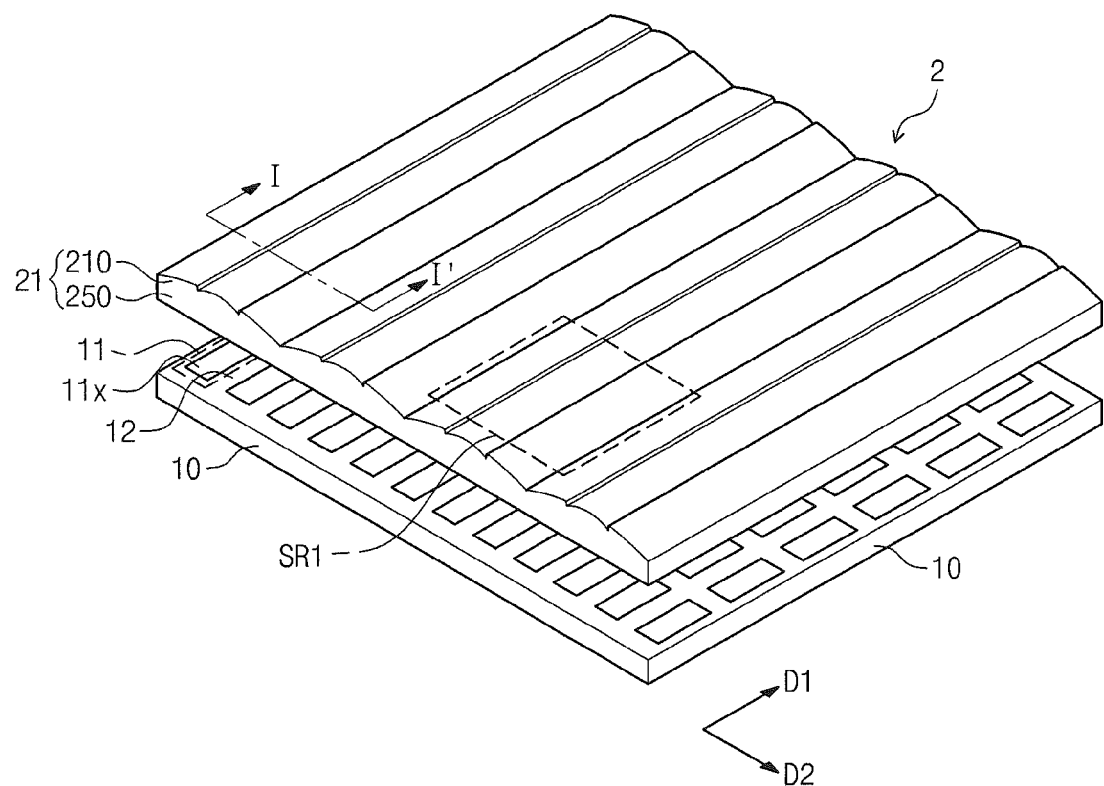
FIG. 2 is an exploded perspective view showing another exemplary embodiment of a display apparatus, according to the invention.

FIG. 2 is an exploded perspective view showing another exemplary embodiment of a display apparatus, according to the invention.

Referring to FIG. 2, the display apparatus 2 includes the display panel 10 and an optical member 21, similar to the display apparatus 1 shown in FIG. 1. Since the display panel 10 of the display apparatus 2 is identical to the display panel 10 shown in FIG. 1, details thereof will be omitted.

The optical member 21 includes a base sheet 250, and one or more of a lens 210 provided on the base sheet 250. The lenses 210 may be manufactured independently from the base sheet 250 as a single unitary indivisible member, and then attached onto the base sheet 250 which itself is as a single unitary indivisible member. Alternatively, the lenses 210 may be integrated with the base sheet 250, such that the lenses 210 and the base sheet 250 collectively form a single unitary indivisible member. The base sheet 250 may include a polymer material.

The lenses 210 longitudinally extend in a first direction D1, and are arranged on the base sheet 250 in a second direction D2 perpendicular to the first direction D1.

Figure 3A:
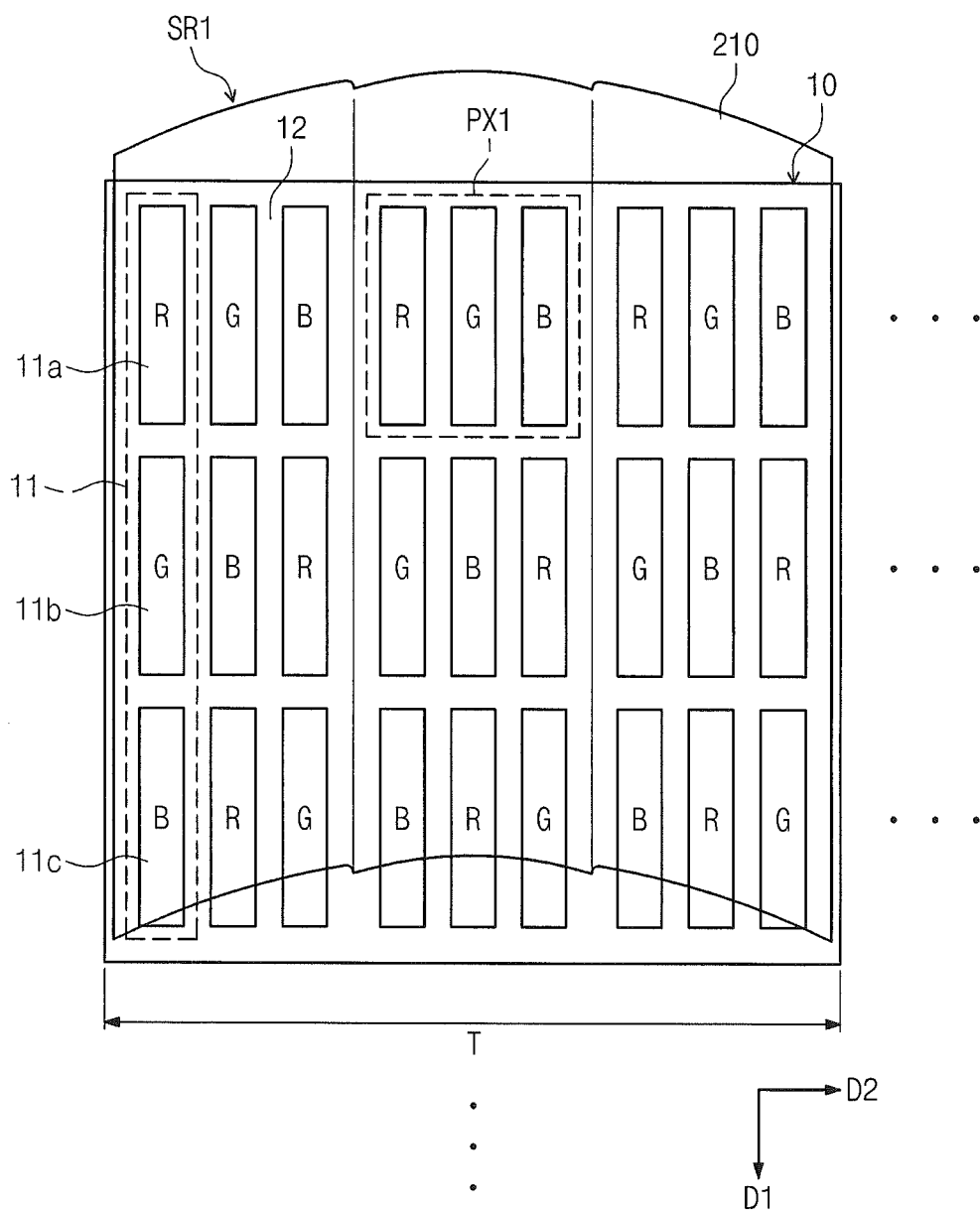
FIG. 3A is a plan view partially showing a display panel and an optical member of the display apparatus shown in FIG. 2.
Figure 3B:
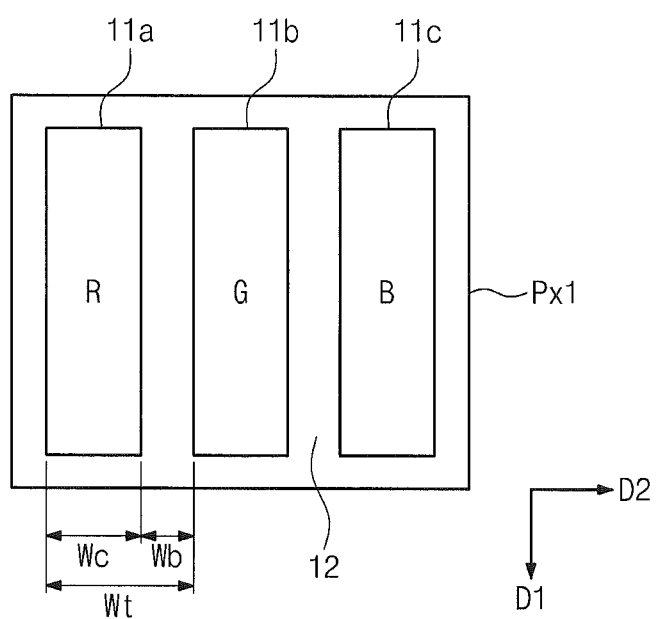
FIG. 3B is an enlarged plan view showing a portion of the display panel of FIG. 3A.

FIG. 3A is a plan view partially showing the display panel 10 and the optical member 21 of the display apparatus 2 shown in FIG. 2, and FIG. 3B is an enlarged plan view showing a portion of the display panel 10 of FIG. 3A.

In detail, FIG. 3A is an enlarged plan view showing a portion SR1 of the display apparatus 2 of FIG. 2, and FIG. 3B is an enlarged plan view showing a portion PX1 of the display panel 10 of FIG. 3A. In addition, FIG. 3A shows a portion of each lens 210 and a portion of the display panel 10 except for the base sheet 250.

Referring to FIGS. 3A and 3B, each pixel 11 includes red, green, and blue sub pixels 11a, 11b, and 11c arranged in the first direction D1, respectively. Among the red, green, and blue sub pixels 11a, 11b, and 11c, sub pixels adjacent to each other in at least one of the first and second directions D1 and D2 have different colors. The black matrix 12 is provided between two adjacent sub pixels among the sub pixels 11a, 11b, and 11c. In more detail, as shown in FIG. 3A, the red sub pixel 11a is adjacent to the green sub pixel 11b in the first and second directions D1 and D2, and the red sub pixel 11a is adjacent to the blue sub pixels 11c in a direction inclined (e.g., diagonal) with respect to the first and second directions D1 and D2.

A width Wc of each sub pixel 11a, 11b, or 11c in the second direction D2, and a width Wb of the black matrix 12 in the second direction D2, have a ratio of Wc:Wb, or M:N (M and N are numbers greater than or equal to 1). In one exemplary embodiment, for example, the width ratio M:N may be 2:1 or 4:1. The width of the sub pixels 11x is substantially the same.

Since the lenses 210 correspond to at least two pixels 11, a width T of each lens 210 in the second direction D2, is at least twice the sum Wt of the width Wc of the sub pixel 11a, 11b, or 11c in the second direction D2 and the width Wb of the black matrix 12 which is provided between two adjacent sub pixels among the sub pixels 11a, 11b, and 11c, in the second direction D2.

Referring to FIG. 3A, each lens 210 corresponds to (e.g., overlaps) nine sub pixels 11a, 11b, and 11c in the second direction D2. Accordingly, the width T in the second direction D2 becomes at least nine times the sum Wt of the width Wc of the sub pixel 11a, 11b, or 11c in the second direction D2 and the width Wb of the black matrix 12 in the second direction D2.

Figure 4A:
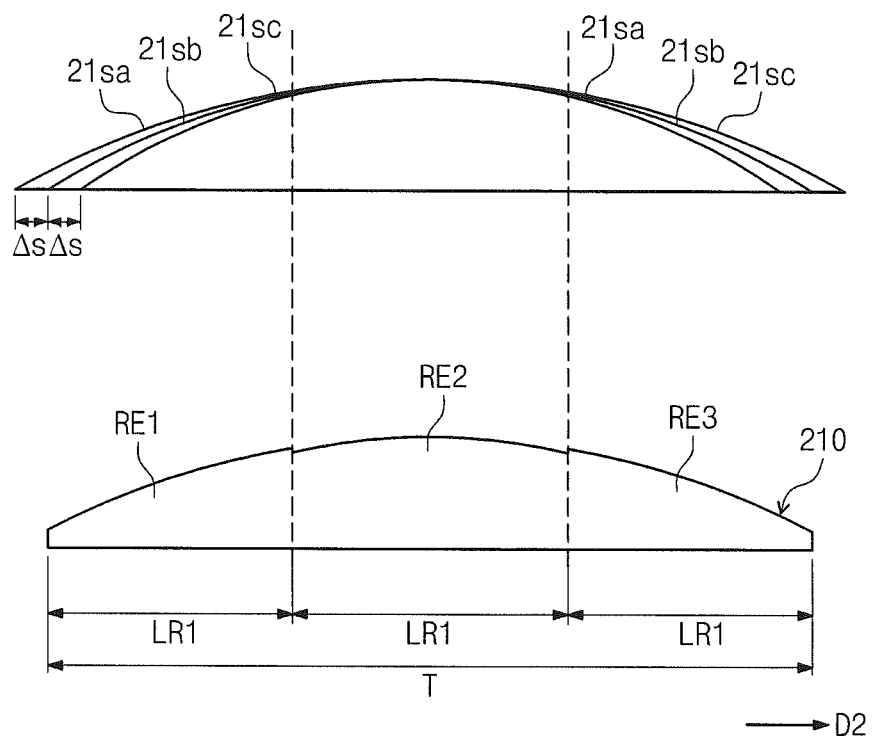
FIG. 4A is a sectional view taken along line I-I' of FIG. 2 for the purpose of explanation of a lens structure.

FIG. 4A is a sectional view taken along line I-I' of FIG. 2 for the purpose of explanation of a lens structure. Although the display apparatus 2 includes a plurality of lenses 210, the lenses 210 have the same structure. Accordingly, hereinafter, only one lens 210 will be representatively described.

Referring to FIGS. 3A, 3B, and 4A, each lens 210 includes J regions, in which the J is a natural number less than or equal to M+N. In one exemplary embodiment, for example, if the M:N is 2:1, each lens 210 includes three regions RE1, RE2, and RE3. The three regions RE1, RE2, and RE3 have the same width LR1 in the second direction D2. In detail, the three regions RE1, RE2, and RE3 have a width corresponding to a value obtained by dividing the width T of each lens in the second direction D2, by the number of regions, J, e.g., three in the illustrated embodiment.

The three regions RE1, RE2, and RE3 of each lens 210 include portions of three sub lenses 21sa, 21sb, and 21sc. The three sub lenses 21sa, 21sb, and 21sc have the same curvature, and are sequentially arranged on a same plane in the second direction D2 while maintaining a predetermined interval Δs at distal ends of the three sub lenses 21sa, 21sb, and 21sc curvatures. That is, the three sub lenses 21sa, 21sb, and 21sc having the same curvature, may be disposed spaced apart in the second direction D2 to define the predetermined interval Δs. Accordingly, the three sub lenses 21sa, 21sb, and 21sc partially overlap with each other.

The interval Δs is a value obtained by dividing the sum of the width Wb of the black matrix 12 shown in FIG. 3B in the second direction D2, and the width Wc of the sub pixel 11a, 11b, or 11c in the second direction D2, by the number of regions, J, e.g., three in the illustrated embodiment.

An L$^{th}$ region includes a portion of an L$^{th}$ sub lens, in which L is a natural number in the range of 1 to J. In other words, the first region RE1 includes a portion of the first sub lens 21sa, and the second region RE2 includes a portion of the second sub lens 21sb. The third region RE3 includes a portion of the third sub lens 21sc. Accordingly, each lens 210 has a curvature shown in FIG. 3, so that each lens 210 has a plurality of focal points.

Figure 4B:
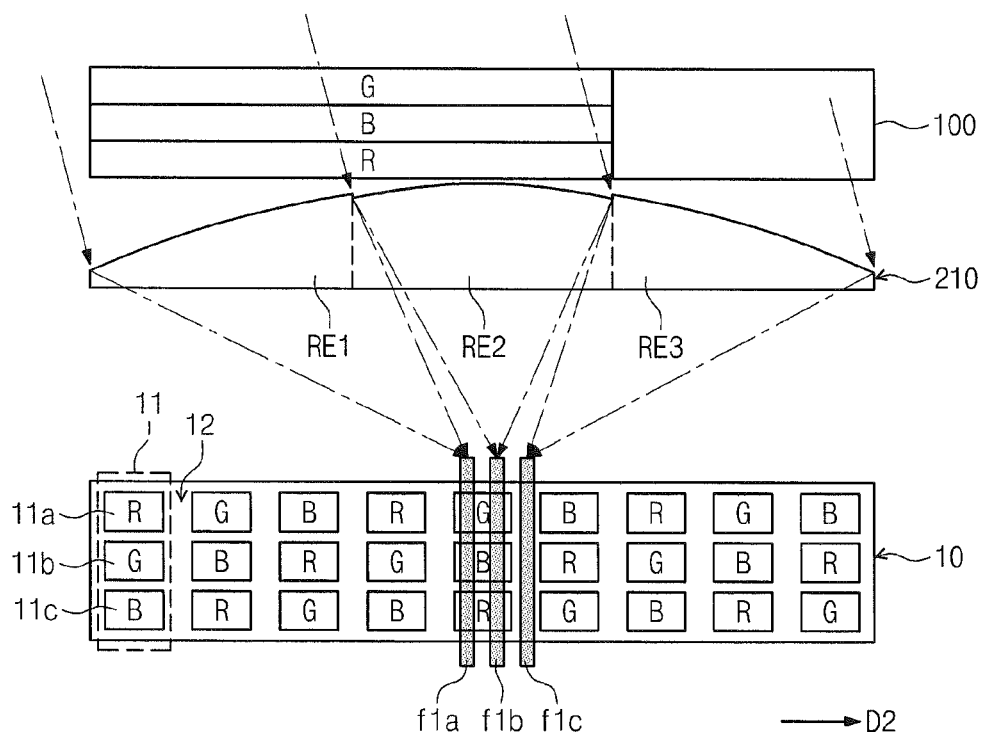
FIG. 4B is a view showing the operating principle of the lens of FIG. 4A.

FIG. 4B is a view showing the operating principle of the lens 210 of FIG. 4A.

FIG. 4B shows the display panel 10, the lens 210 provided on the display panel 10 and an image 100 magnified by the lens 210. Although the display apparatus 2 of FIG. 2 includes a plurality of lenses 210, FIG. 4B shows the operating principle of only one lens 210 for the purpose of explanation. In addition, lights may be incident onto the lens 210 in the same direction while being parallel to each other.

Each lens 210 is configured such that nine pixels 11 correspond to one 3D pixel. Particularly, each lens 210 corresponds to nine sub pixels 11a, 11b, and 11c in a single row taken in the second direction D2, or nine groups of sub pixels 11a, 11b, and 11c in the second direction. A group of sub pixels is arranged in a column in the first direction D1.

Lights incident onto each lens 210 are refracted by the curvature of each lens 210. In the illustrated embodiment, the lights are converged on different points according to regions into which the lights are incident. In detail, lights incident into the first region RE1 are converged on a first focal point f1a which is a focal point of the first sub lens 21sa, and lights incident into the second region RE2 are converged on a second focal point f1b which is a focal point of the second sub lens 21sb. Lights incident into the third region RE3 are converged on a third focal point f1c which is a focal point of the third sub lens 21sc. The three focal points f1a, f1b, and f1c of each lens 210 occur in one-to-one corresponding to curvatures of the sub lenses 21sa, 21sb, and 21sc, respectively, of the three regions RE1, RE2, and RE3.

In the illustrated embodiment, the two focal points f1a and f1b among the three focal points f1a, f1b, and f1c are positioned overlapping the sub pixels 11a, 11b, and 11c, and the remaining one focal point f1c is positioned overlapping the black matrix 12 adjacent to the sub pixels 11a, 11b, and 11c. Accordingly, the focused sub pixels 11a, 11b, and 11c and the black matrix 12 adjacent to the sub pixels 11a, 11b, and 11c are magnified by each lens 210 and viewed (see reference numeral 100). Even if a viewing point is changed so that focal points move, the sub pixels 11a, 11b, and 11c and the black matrix 12 adjacent to the sub pixels 11a, 11b, and 11c are always viewed in the same ratio. Accordingly, a black matrix moiré phenomenon, in which only a black matrix is viewed according to the viewing point of a user, can be reduced or effectively prevented. Accordingly, the uniformity in the brightness distribution of the display apparatus 2 is increased, so that the image quality of a 3D image can be improved.

Figure 5A:
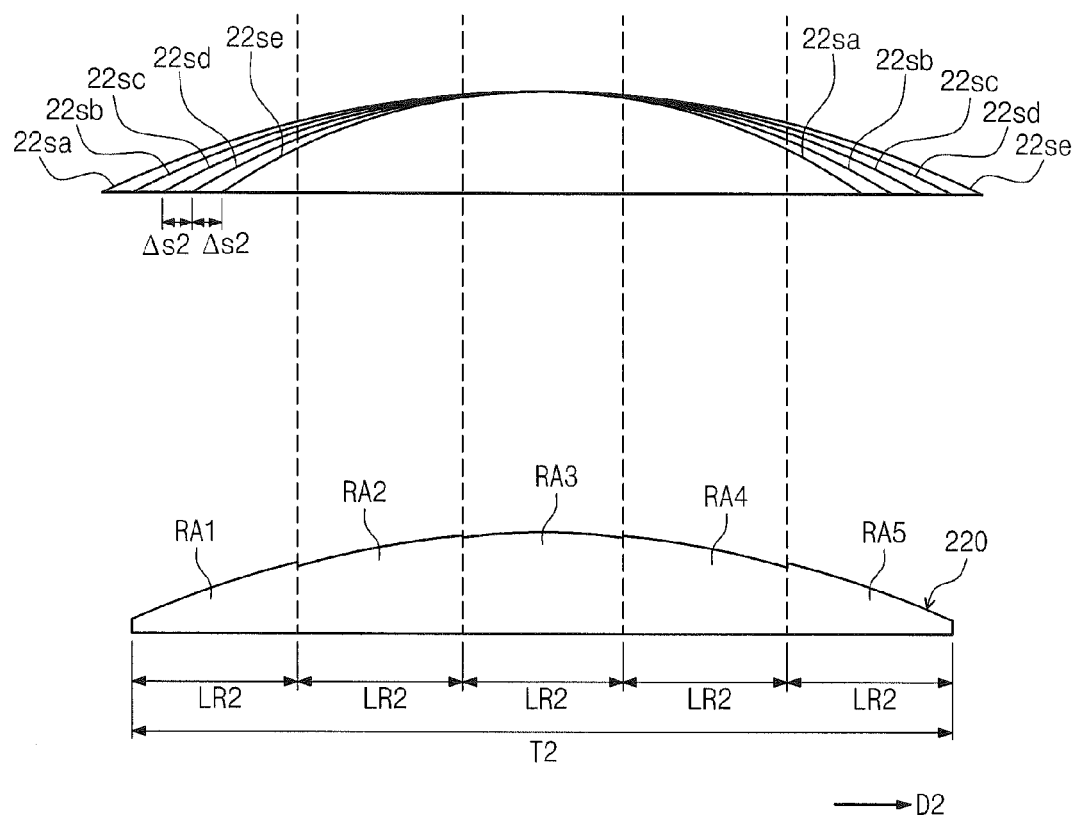
FIG. 5A is a sectional view showing the structure of an alternative exemplary embodiment of a lens provided in the display apparatus, according to the invention.

FIG. 5A is a sectional view showing an alternative exemplary embodiment of the structure of a lens provided in the display apparatus 2, according to the invention. Hereinafter, the illustrated embodiment will be described while focusing on the difference between the embodiment in FIGS. 4A and 4B, and the embodiment in FIGS. 5A and 5B in order to avoid redundancy. The following description will be made with reference to the embodiment in FIG. 1, and the same reference numerals will be used to refer to the same elements.

Referring to FIG. 2, the display apparatus 2 includes the display panel 10 and the optical member 21, and the optical member 21 includes the base substrate 250 and a plurality of lenses 220 provided on the base substrate 250. Similarly to the lenses 210 of FIGS. 4A and 4B, the lenses 220 are arranged in the second direction D2 while extending in the first direction D1.

Referring to FIG. 5A, each lens 220 includes J regions in which the J is a natural number less than or equal to M+N. In one exemplary embodiment, for example, if the M:N is 4:1, each lens 220 includes five regions RA1, RA2, RA3, RA4, and RA5.

The five regions RA1, RA2, RA3, RA4, and RA5 have the same width LR2 in the second direction D2. In detail, the five regions RA1, RA2, RA3, RA4, and RA5 have a width corresponding to a value obtained by dividing the width T2 of each lens 220 in the second direction D2 by the number of regions, J, e.g., five in the illustrated embodiment.

Each lens 220 corresponds to nine sub pixels 11a, 11b, and 11c in a single row taken in the second direction D2. Accordingly, a width T2 of each lens 220 in the second direction D2 becomes nine times the sum Wt of the width Wc of the sub pixel 11a, 11b, or 11c in the second direction D2 and the width Wb of the black matrix 12 which is provided between two adjacent sub pixels among the sub pixels 11a, 11b, and 11c, in the second direction D2.

The five regions RA1, RA2, RA3, RA4, and RA5 of each lens 220 include portions of five sub lenses 22sa, 22sb, 22sc, 22sd, and 22se. The five sub lenses 22sa, 22sb, 22sc, 22sd, and 22se have the same curvature, and are sequentially arranged on the same plane in the second direction D2 while maintaining a predetermined interval Δs2 at distal ends of the five sub lenses 22sa, 22sb, 22sc, 22sd, and 22se curvatures. That is, the five sub lenses 22sa, 22sb, 22sc, 22sd, and 22se having the same curvature, may be disposed spaced apart in the second direction D2, to define the predetermined interval Δs2.

The interval Δs2 is a value obtained by dividing the sum of the width Wb of the black matrix 12 in the second direction D2 and the width Wc of the sub pixel 11a, 11b, or 11c by the number or regions, J, e.g., five in the illustrated embodiment.

The first region RA1 includes a portion of the first sub lens 22sa, the second region RA2 includes a portion of the second sub lens 22sb, and the third region RA3 includes a portion of the third sub lens 22sc. Similarly, the fourth region RA4 includes a portion of the fourth sub lens 22sd, and the fifth region RA5 includes a portion of the fifth sub lens 22se. Accordingly, the lens 220 has a curvature as shown in FIG. 5A, so that each lens 220 has a plurality of focal points.

Figure 5B:
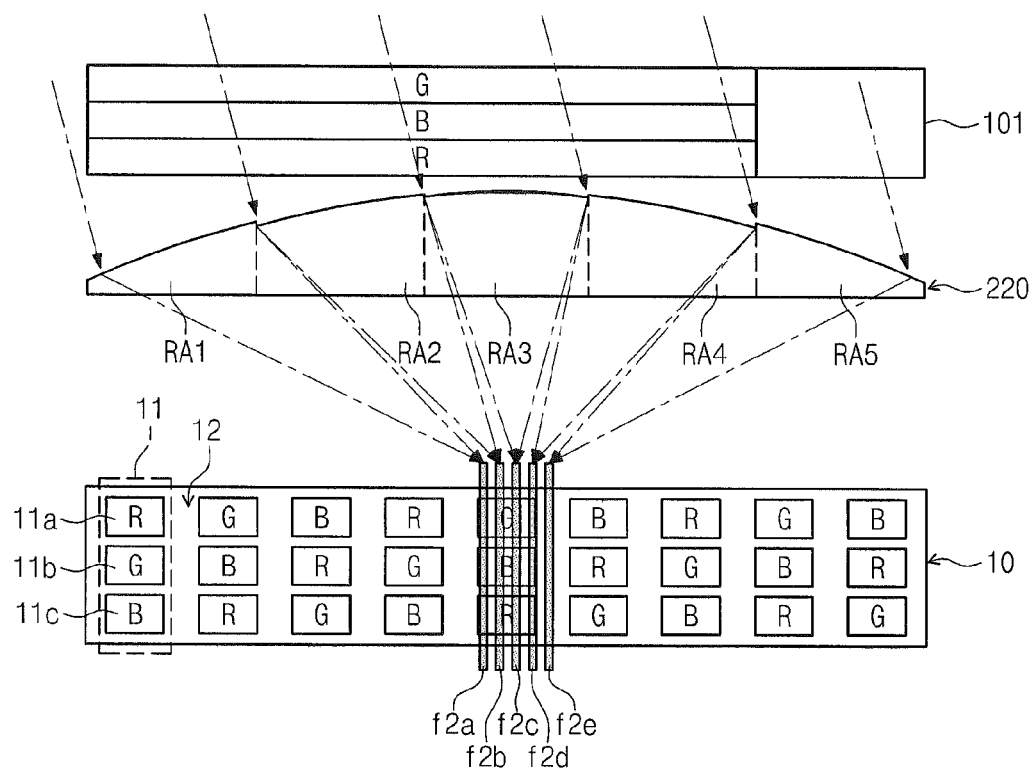
FIG. 5B is a view showing an exemplary embodiment of a path of light passing through the lens of FIG. 5A.

FIG. 5B is a view showing the path of light passing through the lens 220 of FIG. 5A.

FIG. 5B shows the display panel 10, the lens 220 provided on the display panel 10 and an image 101 magnified by the lens 220. According to the illustrated embodiment, although the display apparatus 2 includes a plurality of lenses 220, FIG. 5B shows the operating principle of only one lens 220 for the purpose of explanation. In addition, lights may be incident onto the lens 220 in the same direction while being parallel to each other.

Referring to FIG. 5B, lights incident onto each lens 220 are refracted by the curvature of each lens 220. In the illustrated embodiment, the lights are converged on different points according to regions, into which the lights are incident, among the five regions RA1, RA2, RA3, RA4, and RA5. In detail, lights incident into the first region RA1 are converged on a first focal point f2a which is a focal point of the first sub lens 22sa, lights incident into the second region RA2 are converged on a second focal point f2b which is a focal point of the second sub lens 22sb, and lights incident into the third region RA3 are converged on a third focal point f2c which is a focal point of the third sub lens 22sc. Lights incident into the fourth region RA4 are converged on a fourth focal point f2d which is a focal point of the fourth sub lens 22sd, and lights incident into the fifth region RA5 are converged on a fifth focal point f2e which is a focal point of the fifth sub lens 22se. In detail, the five focal points f2a, f2b, f2c, f2d and f2e of each lens 220 occur in one-to-one corresponding to curvatures of the sub lenses 22sa, 22sb, 22sc, 22sd, and 22se, respectively, of the five regions RA1, RA2, RA3, RA4, and RA5. In other words, each lens 220 has five focal points.

In the illustrated embodiment, four focal points f2a, f2b, f2c, and f2d among the five focal points f2a, f2b, f2c, f2d, and f2e are positioned overlapping the sub-pixels 11a, 11b, and 11c, and the remaining one focal point f2e is positioned overlapping the black matrix 12 adjacent to the sub pixels 11a, 11b, and 11c. Accordingly, the focused sub pixels 11a, 11b, and 11c and the black matrix 12 adjacent to the sub pixels 11a, 11b, and 11c are magnified by each lens 220 and viewed (see, reference numeral 101). Even if the incidence direction of a light onto the lens 220 is changed so that focal points move, the sub pixels 11a, 11b, and 11c and the black matrix 12 adjacent to the sub pixels 11a, 11b, and 11c are always viewed in the same ratio. Accordingly, a black matrix moiré phenomenon, in which only a black matrix is viewed according to the viewing point of a user, can be reduced or effectively prevented.

Figure 6:
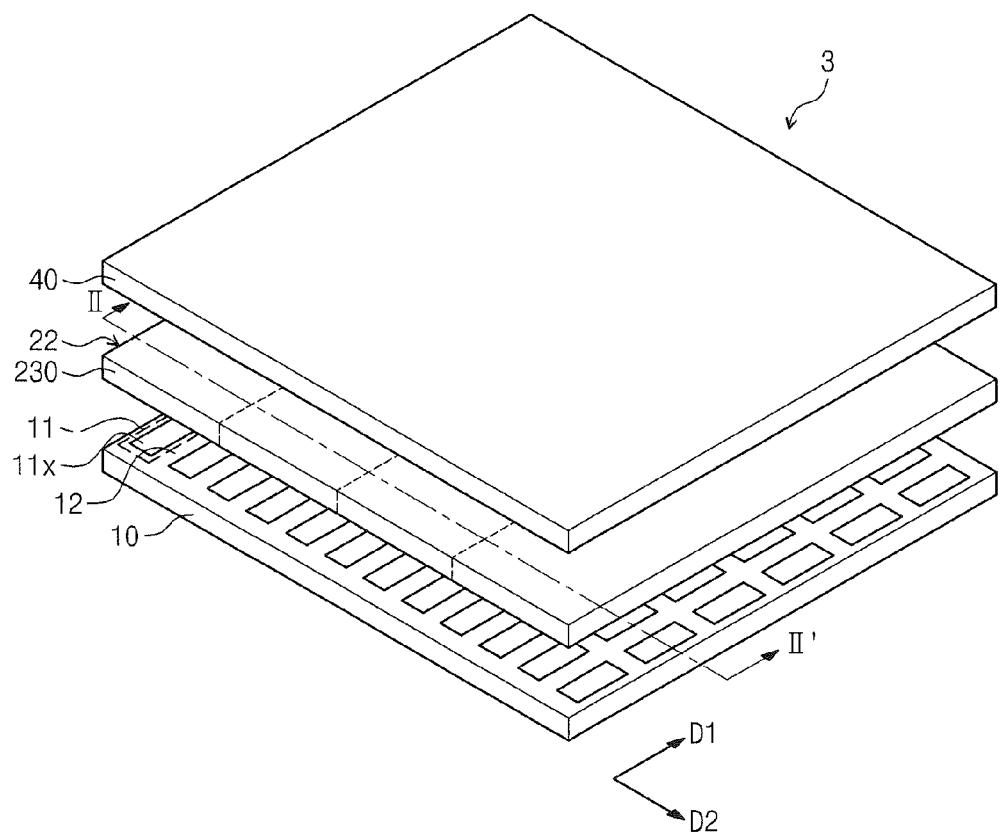
FIG. 6 is an exploded perspective view showing another exemplary embodiment of a display apparatus, according to the invention.
Figure 7:
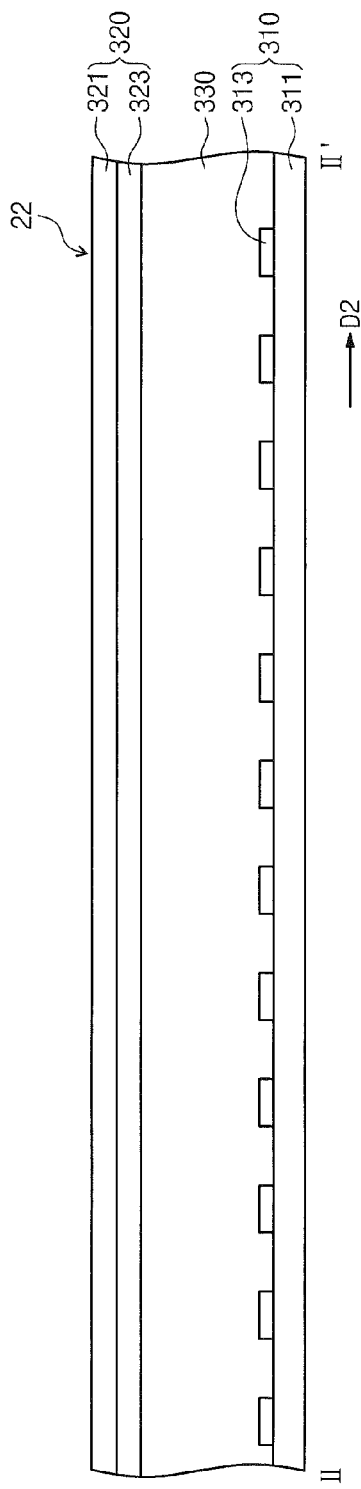
FIG. 7 is a sectional view of a liquid crystal electric field lens taken along line II-II' of FIG. 6.

FIG. 6 is an exploded perspective view showing another exemplary embodiment of a display apparatus, according to the invention, and FIG. 7 is a sectional view of a liquid crystal electric field lens 22 taken along line II-II' of FIG. 6.

Referring to FIGS. 6 and 7, the display apparatus 3 includes the display panel 10, the liquid crystal electric field lens 22, and a polarizing plate 40 provided above the liquid crystal electric field lens 22. Alternatively, the polarizing plate 40 may be omitted when the liquid crystal electric field lens 22 is not a fresnel lens.

Since the display panel 10 has the same structure that of the display panel 10 of FIG. 2, the same reference numeral is assigned to the display panel 10, and details thereof will be omitted.

The liquid crystal electric field lens 22 includes a first substrate 310, a second substrate 320, and a liquid crystal layer 330 interposed between the first and second substrates 310 and 320.

The first substrate 310 includes a first base substrate 311 and a plurality of a first electrode 313. The first electrodes 313 are provided on the first base substrate 311 and spaced apart from each other in the second direction D2.

The second substrate 320 includes a second base substrate 321 opposite to the first substrate 310, and a second electrode 323 provided on the second base substrate 321.

A plurality of an internal lens 230 provided in the liquid crystal electric field lens 22 of the invention, is defined by the first electrodes 313 and the second electrode 323. In detail, if a grounding voltage is applied to the second electrode 323, and a high voltage is applied to the first electrodes 313, an electric field is applied between the first and second substrates 310 and 320 according to the applied voltage. Since the intensity of the electric field varies at each point, liquid crystal transmittance may vary at each point. Accordingly, the internal lenses 230 are formed in the liquid crystal electric field lens 22.

In order to align the liquid crystal layer 330 such that a 2D image passes through the liquid crystal layer 330 when a voltage is not applied, the liquid crystal electric field lens 22 may further include an alignment layer on the first and second electrodes 313 and 323.

Each internal lens 230 has a predetermined width in the second direction D2 proportional to the number of the sub pixels 11x of the display panel 10 aligned in the second direction D2. In other words, each internal lens 230 has the width in the second direction D2 as a multiple of the sum of the width of each sub pixel 11x in the second direction D2 and the width of the black matrix 12 between the sub pixels 11x in the second direction D2. In one exemplary embodiment, for example, if each internal lens 230 corresponds to nine sub pixels 11x in the second direction D2, the width of the internal lens 230 becomes nine times of the sum of the width of each sub pixel 11x in the second direction D2 and the width of the black matrix 12 between the sub pixels 11x in the second direction D2.

According to the illustrated embodiment, the width of each internal lens 230 may be determined by an interval between the first electrodes 313, a number of the first electrodes 313 constituting (e.g., overlapping) one internal lens 230, and the value of voltage applied to the first electrodes 313. According to the illustrated embodiment, each internal lens 230 includes thirty-five first electrodes 313.

Figure 8:
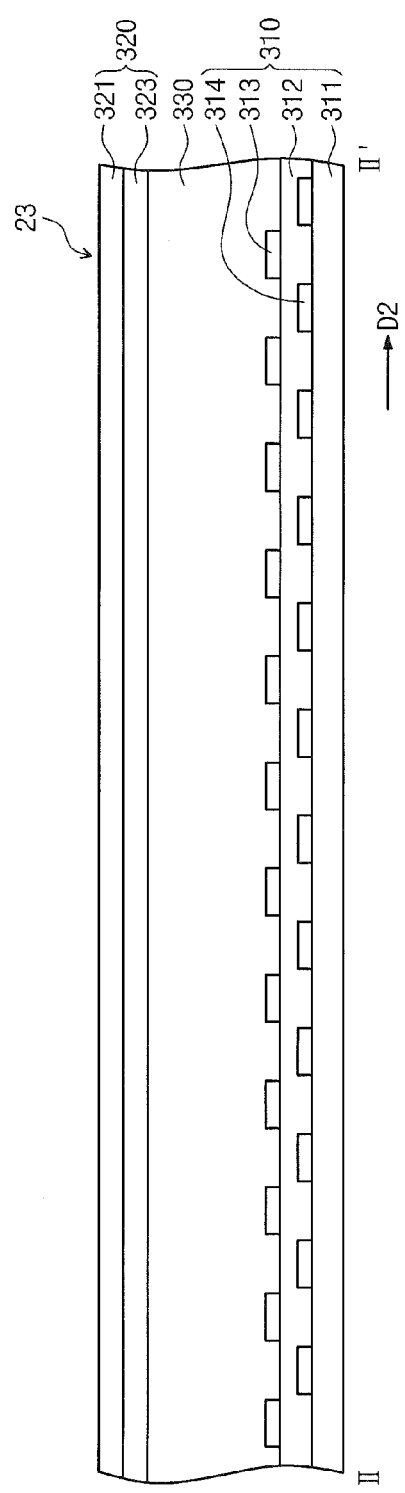
FIG. 8 is a sectional view showing an alternative exemplary embodiment of a liquid crystal electric field lens provided in the display apparatus, according to the invention.

FIG. 8 is a sectional view showing an alternative exemplary embodiment of a liquid crystal electric field lens 23 provided in the display apparatus, according to the invention. Hereinafter, the same reference numerals will be assigned elements identical to those of FIG. 7, and details thereof will be omitted.

Referring to FIG. 8, the liquid crystal electric field lens 23 includes the same elements as those of the liquid crystal electric field lens 22 of FIG. 7, and further includes a plurality of a third electrode 314. The third electrodes 314 are alternately aligned with the first electrodes 313 on the first base substrate 311, in the second direction D2. In the illustrated embodiment, an insulating layer 312 is disposed on the third electrodes 314, contacting upper and side surfaces of the third electrodes 314. The first electrodes 313 are disposed on the insulating layer 312, such that the insulating layer 312 is disposed between the first and third electrodes 313 and 314. An electric field can be more easily adjusted in the structure of the liquid crystal electric field lens 23 as including the third electrodes 314, than in the structure of the liquid crystal electric field lens 22 of FIG. 7 including only the first electrodes 313.

Figure 9A:
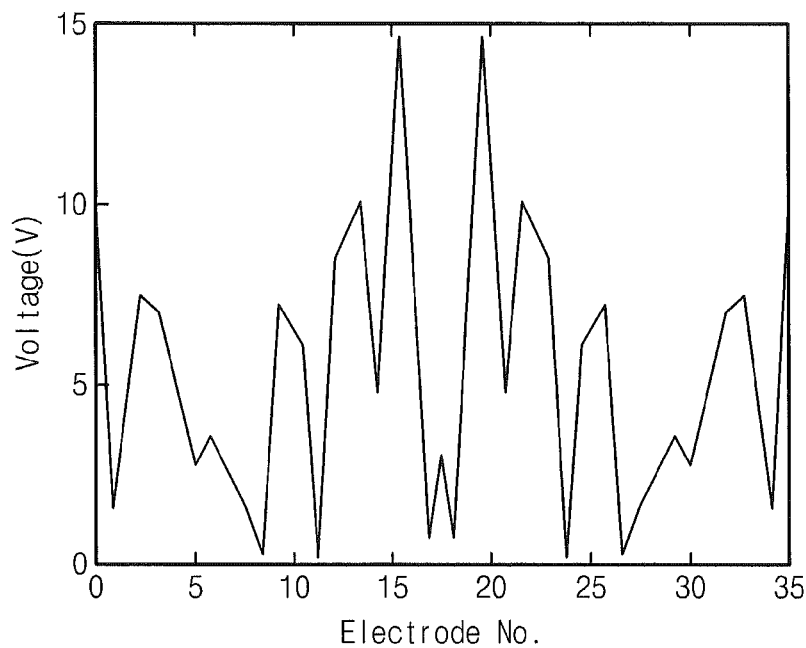
FIGS. 9A and 10A are graphs showing voltages applied to first electrodes forming internal lenses of the liquid crystal electric field lens of FIG. 7.
Figure 9B:
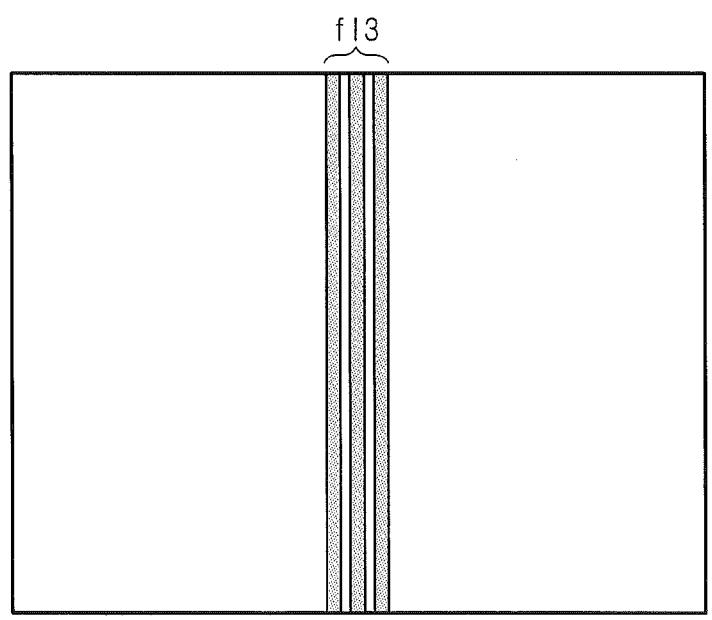
FIGS. 9B and 10B are views showing focal points of the internal lenses formed due to the voltages of FIGS. 9A and 10A.
Figure 10A:
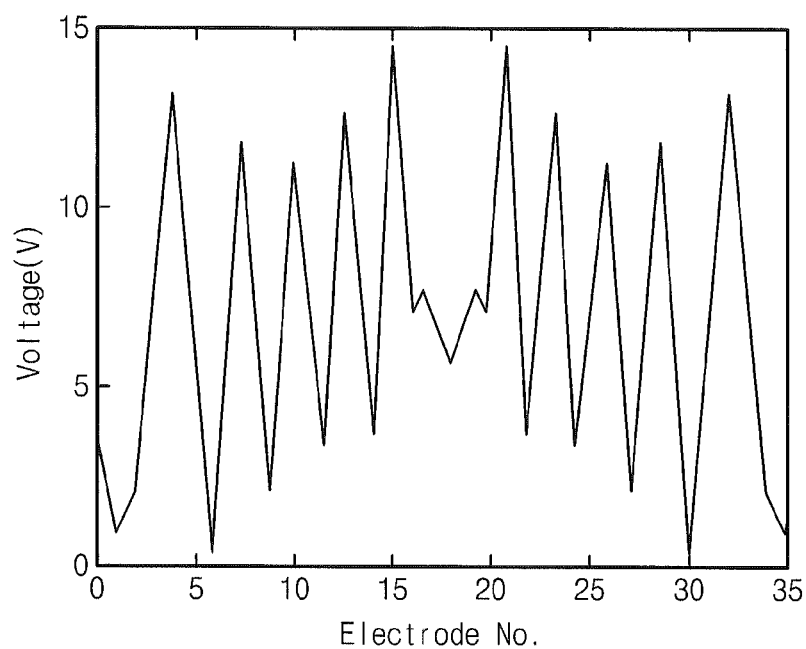
Figure 10B:
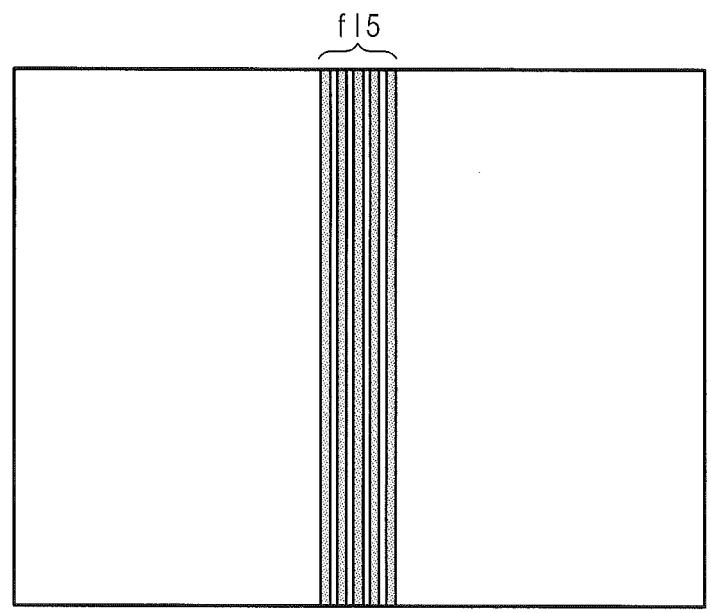

FIGS. 9A and 10A are graphs showing voltages applied to the first electrodes 313 within each internal lens 230 of the liquid crystal electric field lens 22 of FIG. 7, and FIGS. 9B and 10B are graphs showing focal points of each internal lens 230 formed by voltages of FIGS. 9A and 10A. The number of focal points of each internal lens 230 is determined according to voltage values applied to the first electrodes 313.

In the illustrated embodiment of FIG. 7, each internal lens 230 includes thirty-five first electrodes 313. Referring to FIGS. 9A and 10A, an X axis of the graph represents numbers of the first electrodes 313 within each internal lens 230, and a Y axis of the graph represents voltage values applied to the first electrodes 313. The first electrodes 313 are sequentially numbered in the second direction D2. The voltage values applied to the first electrodes 313 can be adjusted by a cell gap and a focal length.

If lights are incident onto the liquid crystal electric field lens 22 in parallel to each other in the same direction after the voltage values of FIG. 9A have been applied to the first electrode 313, the lights are refracted while passing through each internal lens 230, so that three focal points f13 are formed as shown in FIG. 9B.

Referring to FIG. 9B, the three focal points f13 are the same as the focal points f1a, f1b, and f1c shown in FIG. 4B. In other words, each internal lens 230 performs the same function as that of the lens 210 shown in FIGS. 4A and 4B.

In one exemplary embodiment, for example, similarly to the embodiment shown in FIG. 4B, if the ratio of the width of each sub pixel 11x and the width of the black matrix 12 between the sub pixels 11x is 2:1, two among three focal points f13 in FIG. 9B, on which the lights incident onto the liquid crystal electric field lens 22 are converged, are positioned on one of the sub pixels 11x, and the remaining one focal point is positioned on the black matrix 12 adjacent to the sub pixel 11x having the two focal points. Accordingly, a user can recognize the sub pixel 11x and the black matrix 12 on which the focal points f13 are positioned. In the illustrated embodiment, even if the viewing point of the user is changed so that focal points F13 move, the sub pixel 11x and the black matrix 12 are always recognized in the same ratio. Accordingly, a black matrix moiré phenomenon, in which only a black matrix is viewed according to the viewing point of a user, can be reduced or effectively prevented.

Voltages in FIG. 10A are different than voltages in FIG. 9A. Since the number of focal points of each internal lens 230 is determined according to voltage values applied to the first electrodes 313, if lights are incident onto the liquid crystal electric field lens 22 after the voltage values shown in FIG. 10A are applied to the first electrodes 313, five focal points f15 are formed as shown in FIG. 10B. Referring to FIG. 10B, five focal points f15 are identical to focal points f2a, f2b, f2c, f2d, and f2e shown in FIG. 5B, and each internal lens 230 performs the same function as that of the lens 220 shown in FIGS. 5A and 5B.

In other words, similarly to the embodiment shown in FIG. 4B, if the ratio of the width of each sub pixel 11x shown in FIG. 6 and the width of the black matrix 12 between the sub pixels 11x is 4:1, four among five focal points f15 in FIG. 10B, on which the lights incident onto the liquid crystal electric field lens 22 are converged, are positioned on one of the sub pixels 11x, and the remaining one focal point is positioned on the black matrix 12 adjacent to the sub pixel 11x having the four focal points. Accordingly, a user can recognize the sub pixel 11x and the black matrix 12 on which the focal points f13 are positioned. In the illustrated embodiment, even if the viewing point of the user is changed so that focal points moves, the sub pixel 11x and the black matrix 12 are always recognized in the same ratio. Accordingly, a black matrix moiré phenomenon, in which only a black matrix is recognized according to the viewing point of a user, can be reduced or effectively prevented.

Each internal lens 230 may serve as a fresnel lens. In the fresnel lens, lens surfaces serving as concave or convex lenses are divided and the divided lens surfaces are arranged with a predetermined height. A liquid crystal electric field lens in which the internal lenses 230 serve as a fresnel lens, is called a liquid crystal fresnel lens.

Different from a conventional liquid crystal electric field lens requiring a cell gap of about 50 micrometers (μm), since a liquid crystal fresnel lens requires a cell gap in the range of about 10 μm to about 50 μm, the thickness of a liquid crystal electric field lens can be reduced. However, in the liquid crystal fresnel lens, light leakage may occur due to a light transmitting through a region corresponding to divided lens surfaces adjacent to each other. If the internal lens 230 of FIG. 6 is a fresnel lens within the structure shown in FIG. 6, the polarizing plate 40, which has a polarizing axis perpendicular to or horizontal to the first electrodes 313 of the liquid crystal electric field lens 22, is provided above the liquid crystal electric field lens 22, thereby preventing light leakage.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a display panel which displays a two-dimensional image and comprises:
      a plurality of pixels arranged in a matrix, each pixel comprising a plurality of sub pixels; and
      a black matrix between sub pixels adjacent to each other; and
   an optical member on the display panel, comprising a plurality of lenses elongated in a first direction, and arranged in a second direction perpendicular to the first direction, each lens including a plurality of focal points and configured such that at least two pixels of the display panel correspond to one three-dimensional pixel, wherein the lenses divide the two-dimensional image of the display panel into left and right eye images,
   wherein
   a width of a sub pixel in the second direction and a width of the black matrix provided between adjacent sub pixels in the second direction have a ratio of M:N, in which the M and N are numbers greater than or equal to 1,
   wherein each lens has J focal points, in which J is a greatest natural number satisfying an equation: $J \leq M+N$, and
   a portion of the plurality of focal points overlaps one of the sub pixels, and a remaining focal point overlaps the black matrix adjacent to the one of the sub pixels in the second direction.

2. The display apparatus of claim 1,
   wherein the each pixel of the display panel comprises a red, a green, and a blue sub pixel.

3. The display apparatus of claim 2, wherein sub pixels, which are adjacent to each other in the first direction or the second direction, have colors different from each other.

4. The display apparatus of claim 2,
   wherein the each lens has a second directional width defined by at least twice a sum of a width of a sub pixel in the second direction and a width of the black matrix in the second direction between the adjacent sub pixels in the second direction.

5. The display apparatus of claim 1,
   wherein the each lens comprises J regions in the second direction, and the J regions comprise a portion of J sub lenses,
   wherein the sub lenses have a same curvature and are sequentially arranged while partially overlapping with each other in the second direction, and
   wherein an $L^{th}$ region among the J regions comprises a portion of an $L^{th}$ sub lens among the J sub lenses, in which L is a natural number in a range of 1 to J.

6. The display apparatus of claim 5, wherein the sub lenses are arranged on a same plane, and the sub lenses adjacent to each other in the second direction are spaced apart from each other by a predetermined interval, and
   wherein the predetermined interval is a value obtained by dividing the sum of the width of the black matrix and the width of the sub pixel, by J.

7. The display apparatus of claim 5, wherein the J focal points correspond to curved surfaces of the J regions in one-to-one correspondence.

8. The display apparatus of claim 5, wherein the regions have a same width in the second direction when viewed in a plan view.

9. The display apparatus of claim 1, wherein the M:N is 2:1.

10. The display apparatus of claim 1, wherein the M:N is 4:1.

11. The display apparatus of claim 1, wherein the optical member further comprises a base sheet, and the lenses are on the base sheet.

12. The display apparatus of claim 1, wherein the optical member further comprises a liquid crystal electric field lens comprising:
    a first substrate which comprises a first base substrate, and a plurality of first electrodes spaced apart from each other on the first base substrate,
    a second substrate which comprises a second base substrate opposite to the first substrate, and a second electrode on the second base substrate, and
    a liquid crystal layer interposed between the first and second substrates, and
    wherein the lenses of the optical member are a plurality of internal lenses in the liquid crystal electric field lens due to voltages applied to the first and second electrodes.

13. The display apparatus of claim 12, further comprising:
    an insulating layer interposed between a lower portion of the first electrodes and the first base substrate; and
    a plurality of third electrodes alternately aligned with the first electrodes in the second direction, and interposed between the insulating layer and the first base substrate.

14. The display apparatus of claim 12, wherein each internal lens is defined by at least two first electrodes and the second electrode, and has a plurality of focal points according to voltage values applied to the at least two first electrodes.

15. The display apparatus of claim 12, wherein each internal lens comprises a fresnel lens.

16. The display apparatus of claim 15, further comprising a polarizing plate above the liquid crystal electric field lens.

17. A method of forming a display apparatus, the method comprising:
    forming a display panel which displays a two-dimensional image and comprises: a plurality of pixels including sub-pixels arranged in a matrix, and a black matrix disposed between the sub pixels adjacent to each other;
    forming an optical member comprising a plurality of lenses elongated in a first direction, and arranged in a second direction perpendicular to the first direction, each lens including a plurality of focal points and configured such that at least two pixels of the display panel correspond to one three-dimensional pixel, wherein the lenses of the optical member divide the two-dimensional image of the display panel into left and right eye images; and
    disposing the optical member on the display panel,
    wherein
    the forming a display panel includes defining a width of each sub pixel in the second direction and a width of the black matrix provided between the adjacent sub pixels in the second direction to have a ratio of M:N in which the M and N are numbers greater than or equal to 1,
    the forming an optical member includes defining each lens to have J focal points, in which J is a greatest natural number satisfying an equation: $J \leq M+N$, and
    a portion of the plurality of focal points overlaps one of the sub pixels, and a remaining focal point overlaps the black matrix adjacent to the one of the sub pixels in the second direction.

* * * * *